(12) United States Patent
Thele

(10) Patent No.: US 7,399,515 B1
(45) Date of Patent: Jul. 15, 2008

(54) PROTECTING LAMINATE FOR AUTOMOTIVE CARPETING

(75) Inventor: Bernhard Thele, Bad Schwalbach (DE)

(73) Assignee: Cryovac, Inc., Duncan, SC (US)

( * ) Notice: Subject to any disclaimer, the term of this patent is extended or adjusted under 35 U.S.C. 154(b) by 87 days.

(21) Appl. No.: 10/499,382

(22) PCT Filed: Jul. 6, 2000

(86) PCT No.: PCT/EP00/06425

§ 371 (c)(1),
(2), (4) Date: Nov. 1, 2004

(87) PCT Pub. No.: WO01/07252

PCT Pub. Date: Feb. 1, 2001

(30) Foreign Application Priority Data

Jul. 23, 1999 (EP) .................................. 99114478

(51) Int. Cl.
B32B 27/00 (2006.01)
B32B 27/08 (2006.01)
B32B 27/32 (2006.01)
B32B 27/34 (2006.01)
B32B 27/40 (2006.01)
B32B 33/00 (2006.01)
B32B 37/00 (2006.01)

(52) U.S. Cl. .................. 428/95; 428/97; 428/423.1; 428/423.5; 428/474.4; 428/476.3; 156/60; 156/72

(58) Field of Classification Search .................. 428/95, 428/97, 423.1, 423.5, 474.4, 476.3; 156/72, 156/60

See application file for complete search history.

(56) References Cited

U.S. PATENT DOCUMENTS

| | | | | | |
|---|---|---|---|---|---|
| 4,686,125 | A | * | 8/1987 | Johnston et al. | 383/116 |
| 4,692,361 | A | * | 9/1987 | Johnston et al. | 428/35.4 |
| 5,567,489 | A | * | 10/1996 | Allen et al. | 428/34.1 |
| 5,681,627 | A | * | 10/1997 | Mueller | 428/35.2 |
| 6,143,383 | A | * | 11/2000 | Giori | 428/35.2 |
| 6,270,882 | B1 | * | 8/2001 | Eggers et al. | 428/213 |
| 6,450,994 | B1 | * | 9/2002 | Boyles et al. | 604/294 |
| 6,455,161 | B1 | * | 9/2002 | Regnier et al. | 428/412 |
| 2002/0124526 | A1 | * | 9/2002 | Lewis et al. | 53/396 |
| 2003/0177739 | A1 | * | 9/2003 | Lewis et al. | 53/425 |

FOREIGN PATENT DOCUMENTS

| | | | |
|---|---|---|---|
| EP | 754547 A1 | * | 1/1997 |
| JP | 60201840 A | * | 10/1985 |
| JP | 60201940 A | * | 12/1985 |
| JP | 05147172 A | * | 6/1993 |
| JP | 05246274 A | * | 9/1993 |
| WO | WO 9507817 A1 | * | 3/1995 |

* cited by examiner

Primary Examiner—Cheryl Juska
(74) Attorney, Agent, or Firm—Daniel B. Ruble

(57) ABSTRACT

Another object of the present invention is therefore a process for the preparation of a carpet comprising an upper fibrous layer, an intermediate thermoplastic protective laminate and a polyurethane foam layer wherein the polyurethane foam layer is formed on the surface of the protective laminate which is hot bonded to the upper fibrous layer characterized in that said protective laminate comprises a first outer layer which is facing the upper fibrous layer comprising an ethylene homo- or copolymer, a core layer comprising a polyamide and a second outer layer comprising a thermoplastic polyurethane.

Figure 1:
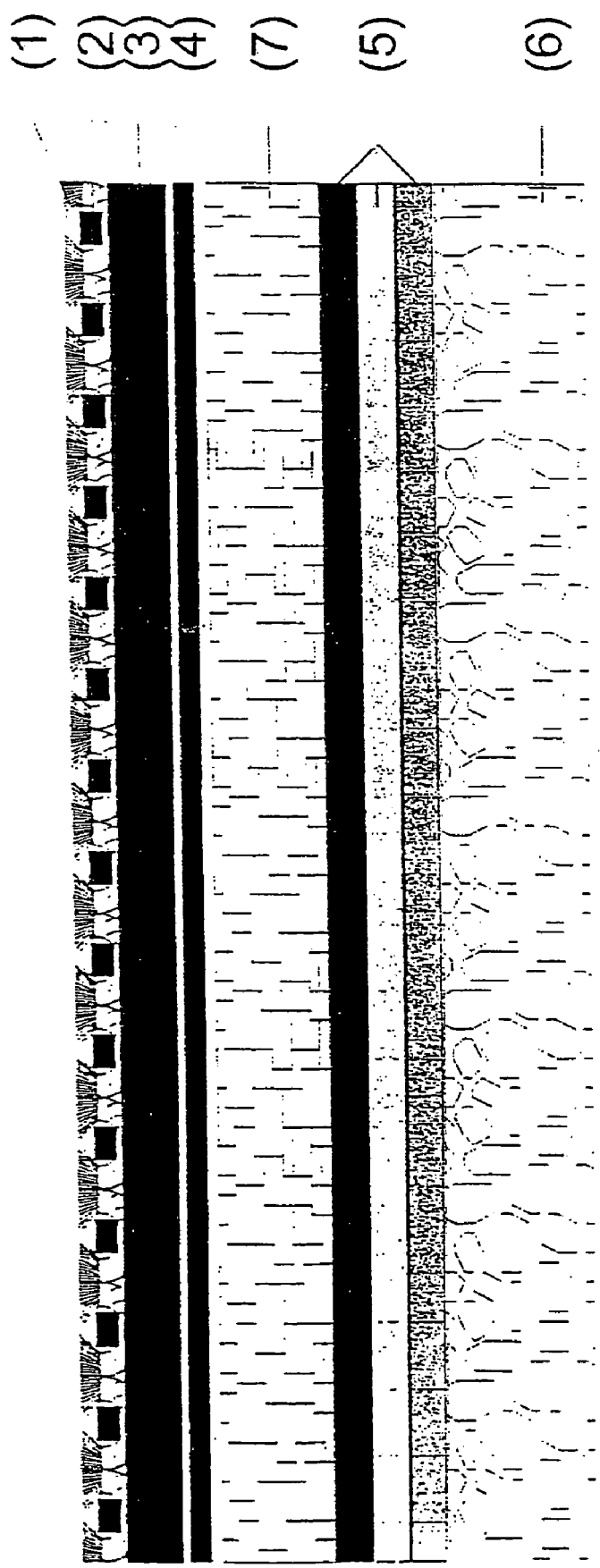

16 Claims, 3 Drawing Sheets (1) (2)(3)(4) (5)　(6)

PROTECTING LAMINATE FOR AUTOMOTIVE CARPETING

The present invention relates to carpeting, in particular to automotive carpeting, to a process for the production thereof and to a thermoplastic multilayer film particularly suitable for use as a protective laminate for molded carpets with polyurethane foam-padded backing.

The interior (floor, inside roof, door and side paneling, rear window shelf, columns, etc.) and the luggage compartment (rear partitions, rear load floor, side paneling, tailgate, etc.) in a vehicle are covered with carpets of various classes and qualities, which by means of molding (pressing the carpet pattern) can be exactly adjusted to fit the shell body of the respective vehicle model.

Carpets are usually fitted into vehicles, particularly cars, to improve comfort by reducing noise levels, increasing thermal insulation and resilience underfoot and adding to the decor.

The floor covering of small and middle-class vehicles is usually of pile. In upper classes as well as in the comfort and luxury classes high-grade velvet-pile carpeting is used with few exceptions.

Vehicles from the upper class to the luxury class are fitted with high-grade velvet-pile molded carpet, which is padded with a polyurethane soft foam backing.

Besides an upper fibrous layer and a flexible polyurethane foam layer, all the carpets also comprise a thermoplastic resin interlayer.

There are at least two general processes for the manufacture of automotive carpets.

In one of them the upper fibrous layer is sprinkled on the reverse side with polyethylene powder (about 200-400 g/m$^2$). The powder is melted into a film by means of radiant heat treatment. A thermoplastic protective laminate is bonded under pressure to the polyethylene film and then a heavy layer (fleece, non-woven fabric or felt) is laminated onto the surface of the protective laminate. Sometimes the heavy layer is fixed without using the polyethylene powder.

Rolled goods are then divided into carpet pieces. The individual pieces are placed in the feeder of the molding machine where they undergo radiant heat treatment in particular areas and strengthened with additional, fitted heavy material.

Finally the carpet pieces are conveyed to a forming station, heated to approximately 140° C. and shaped with the appropriate plug.

The shaped sections are hung on a conveyor belt and transported one by one into the foam-padding chamber. In these closed chambers, whose inside shape on the reverse side of the carpet corresponds exactly to the shape of the vehicle floor it will be applied to the hollow on the back of the molded carpet is filled under pressure with polyurethane soft foam.

When the element has cooled, a robot cuts it exactly to fit using a water jet.

The function of the protective laminate in molded carpet manufacturing is to tightly protect the shaped carpet from the high-pressure injected polyurethane foam. The foam must be prevented from penetrating the underside of the carpet and soiling the surface.

Typically protective laminates 40 to 60 µm thick, comprising a core polyamide layer and outer polyethylene layers are employed in this process.

In the other process, the upper fibrous layer is sprinkled on the reverse side with polyethylene powder (about 400 to 600 g/m$^2$) in a laminating machine. Then a heavy layer is fixed upon it and a protective thermoplastic laminate is put onto the heavy layer.

The outer layer of the protective laminate bonded to the heavy layer will typically be of polyethylene while the other outer layer will be of polyamide. Since polyurethane soft foam adhers directly to polyamide, this outer layer is foam coated on the back.

This latter process appears to be the most advanced one but still presents some disadvantages:

i) since the protective laminate lies on the outside of the molded carpet to be padded with foam polyurethane, the essential polyamide layer will be more readily damaged and a thicker laminate, with respective to that required by the former process, is needed;

ii) if all free surfaces are not covered during the radiant heat treatment, the laminate will burn through on the unprotected areas.

Protective laminates with a different structure have been proposed to overcome these drawbacks.

Japanese Kokai 201940/85 (Derwent Accession Number 85-293325) describes for instance the use of a thermoplastic elastomer layer, typically formed from partially cross-linked ethylene-α-olefin copolymer rubber, laminated to a polyurethane foam layer by means of an adhesive based on a high vinyl acetate EVA copolymer.

Japanese Kokai 147172/93 (Derwent Accession Number 93-223931) teaches the use of an elastomer composition of ethylene-propylene diene copolymer and EVA.

Still however the mechanical properties provided by the polyamide are missing and the adhesion of the polyurethane foam to said intermediate laminate is unsufficient.

Object of the present invention is a thermoplastic laminate, particularly suitable for use as a protective laminate in the manufacture of a polyurethane padded carpet for the automotive industry, that is characterized by good mechanical properties at low thickness and by a suitable adhesive strength to the polyurethane foam without the need of an additional adhesive in-between.

The protective thermoplastic laminate according to the present invention comprises at least three layers and is characterized by the presence of a first outer layer comprising an ethylene homo- or copolymer, a core layer comprising a polyamide and a second outer layer comprising a thermoplastic polyurethane.

If necessary or advisable to imrpove the bond between the outer layer and the core layer, suitable tie layers may also be present in the laminate.

DEFINITIONS

As used herein, the phrases "inner layer" and "internal layer" refer to any film layer having both of its principal surfaces directly adhered to another layer of the film.

As used herein, the phrase "outer layer" refers to any film layer having only one of its principal surfaces directly adhered to another layer of the film.

As used herein, the term "core", and the phrase "core layer" refer to any internal film layer that has a primary function other than serving as an adhesive or compatibilizer for adhering two layers to one another.

As used herein, the phrase "bulk layer" refers to any layer that is present for the purpose of improving the abuse-resistance, toughness, modules, etc., of the film. Bulk layers generally comprise polymers which are inexpensive relative to other polymers in the film which provide some specific purpose unrelated to abuse-resistance, modulus, etc.

As used herein, the phrase "tie layer" refers to any internal layer having the primary purpose of adhering two layers to one another.

As used herein the term "polyethylene" and "ethylene homopolymer" identify polymers consisting essentially of an ethylene repeating unit. Depending on the polymerization process employed, polymers with a different degree of branching and a different density can be obtained. Those characterized by a low degree of branching and showing a density higher than 0.940 g/cm$^2$ are called HDPE while those with a higher level of branching and a density up to 0.940 g/cm$^2$ are called LDPE.

As used herein the term "ethylene copolymer" refers to the copolymers of ethylene with one or more other olefins and/or with a non-olefinic comonomer copolymerizable with ethyelene, such as vinyl monomers, modified polymers thereof, and the like. Specific examples include ethylene-α-olefin copolymers, ethylene/vinyl acetate copolymers, ethylene/ethyl acrylate copolymers, ethylene/butyl acrylate copolymers, ethylene methyl acrylate copolymers, ethylene/acrylic acid copolymers, ethylene/methacrylic acid copolymers, ionomer resins, ethylene/alkyl acrylate/maleic anhydride terpolymers, etc.

As used herein, the phrase "heterogenous polymer" refers to polymerization reaction products of relatively wide variation in molecular weight and relatively wide variation in composition distribution, i.e., polymers made, for example, using conventional Ziegler-Natta catalysts. Such polymers typically contain a relatively wide variety of chain lengths and comonomer percentages.

As used herein, the phrase "homogenoeus polymer" refers to polymerization reaction products of relatively narrow molecular weight distribution and relatively narrow composition distribution. Homogeneous polymers exhibit a relatively even sequencing of comonomers within a chain, the mirroring of sequence distribution in all chains, and the similarity of length of all chains, and are typically prepared using metallocene, or other single-site type catlaysis.

More particularly, homogeneous ethylene/α-olefin copolymers may be characterized by one or more methods known to those of skill in the art, such as molecular weight distribution (Mw/Mn), composition distribution breadth index (CDBI), and narrow melting point range and single metl point behavior.

As used herein, the term "ethylene/α-olefin copolymer" refers to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as EXACT™ materials supplied by Exxon. AFFINITY™ and ENGAGE™ materials supplied by Dow. LUFLEXEN™ materials supplied by BASF and TAFMER™ materials supplied by Mitsui Petrochemical Corporation. These materials generally include copolymers of ethylene with one or more comonomers selected from $C_4$ to $C_{10}$ α-olefins such as butene-1, hexene-1, ocene-1, etc.

As used herein the term "ethylene-acrylic acid and ethylene-methacrylic acid copolymers" refers to copolymers of ethylene with a copolymerisable ethylenically unsaturated carboxylic acid monomer selected form acrylic acid and methacrylic acid. The copolymer typically contains from about 4 to about 18% by weight of acrylic or methacrylic acid units. Said copolymer can also contain copolymerised therein an alkyl (meth)acrylate, such as n-butyl acrylate or methacrylate or isobutyl acrylate or methacrylate. Said copolymer an be in the free acid form as well as in the ionized or partially ionized form wherein the neutralizing cation can be any suitable metal ion, e.g. an alkali metal ion, a zinc ion or other multivalent metal ions: in this latter case the copolymer is also termed "ionomer".

As used herein the term "ethylene-vinyl acetate copolymer" or "EVA" is intended to refer to a copolymer formed form ethylene and vinyl acetate monomers wherein the ethylene derived units in the copolymer are present in major amounts: preferably between about 60% and 98% by weight and the vinyl acetate derived units in the copolymer are present in minor amounts, preferably between about 2% and about 40% by weight.

As used herein the term "ethylene-alkyl (meth)acrylate copolymers" refers to copolymers of ethylene with alkyl (meth)acrylates, e.g. methyl (meth)acrylate, butyl (meth)acrylate, and iso-butyl (meth)acrylate wherein the ethylene derived units in the copolymer are present in major amounts and the alkyl (meth)acrylate derived units in the copolymer are present in minor amounts, preferably between about 2% and about 28% by weight.

As used herein, the term polyamide is intended to refer to both polyamides and co-polyamides. The term specifically includes those aliphatic polyamides or copolyamides commonly referred to as e.g. polyamide 6 (homopolymer based on ϵ-caprolactam), polyamide 66 (homopolycondensate based on hexamethylenediamine and adipic acid), polyamide 69 (homopolycondensate based on heaxmethylenediamine and azelaic acid), polyamide 610 (homopolycondensate based on hexamethylenediamine and sebacic acid), polyamide 612 (homopolycondensate based on hexamethylenediamine and dodecandioic acid), polyamide 11 (homopolymer based on 11-aminoundecanoic acid), polyamide 12 (homopolymer based on ω-aminododecanoic acid or on laurolactam), polyamide 6/12 (polyamide copolymer based on ϵ-caprolactam and laurolactam), polyamide 6/66 (polyamide copolymer based on hexamethylenediamine and adipic acid and ϵ-caprolactam), polyamide 66/610 (polyamide copolymers based on hexamethylenediamine, adipic acid and sebacic acid), terpolyamides, modifications thereof and blends thereof. Said term also includes crystalline or partially crystalline, aromatic or partially aromatic, polyamides.

As used herein the term "modified polyolefin" is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like; as well as of modified polymer obtained by incorporating, into the olefin homopolymer or copolymer, an unsaturated carboxylic acid, e.g. maleic acid, fumaric acid, or the like, or a derivative thereof such as the anhydride, ester or metal salt or the like. Examples of said modified polyolefins are graft copolymers of maleic acid or anhydride onto ethylene/α-olefin copolymers, graft copolymers of fused ring carboxylic anhydrides onto polyethylene, resin mixtures of these and mixtures with polyethylene or ethylene/α-olefin copolymers.

DETAILED DESCRIPTION OF THE INVENTION

The protective laminate according to the present invention comprises at least three layers: afirst outer layer, a core layer and a second outer layer.

The first outer layer comprises an ethylene homo- or co-polymer as defined above. In a preferred emboidment of th epresent inveniotn said first outer layer comprises an ethylene homo- or copolymer selected from the group consisting of ethylene homo-polymers and ethylene-α-olefin copolymers. In a more preferred embodiment said first outer layer comprises an ethylene homo- or co-polymer selected from the group consisting of polyethylene of low, medium or high density, and homogeneous or heterogeneous ethylene-α-olefin copolymers of low or medium density (LLDPE or LMDPE).

Said first outer layer may also comprise in addition to the ethylene homo- or co-polymer a modified polyolefin, preferably a modified ethylene homo- or co-polymer, to possibly avoid the use of a separate tie layer to improve the bond between said first outer layer and the core polyamide layer. In such a case the amount of modified polyolefin may be as low as 5-10% by weight of the overall weight of the first outer layer and still provide for the desired improved adhesion.

The core layer comprises a polyamide as defined above.

In a preferred embodiment of the present invention the polyamides suitable for use in said core layer have a melting temperature below 220° C. In a more prefrred embodiment said core layer comprises a polyamide with a melting temperature below 210° C. Certain copolyamides 6/12 (such as PA6/12 CR-8 and CR-9 by EMS), certain copolyamides 6/66 (such as Cniamid CF 815 by Caffaro), certain copolyamides of polyamide 6 and a partially aromatic polyamide (such as Durethan® CI31F and CI13FKS by Bayer) or certain terpolyamides such as those based on polyamide 6, polyamide 11, and polyamide 66 (such as those sold by Bayer under the trade name Durethan® KU 2-2153 or KU 2-2153F), are examples of suitable polyamides.

The second outer layer in the protective laminate of the present invention comprises a thermoplastic polyurethane, or a blend of thermoplastic polyurethanes.

The thermoplastic polyurethane of the second outer layer may be of the ehter or of the ester type. In case a blend of polyurethanes is employed, each polyurethane components may independently be of the ether or ester type.

These polymers tend to be sticky and are suitable blended with anti blocking agents. They can be used in blends in order to adjust the polymer flow viscosity and surface tackiness as desired.

In a preferred embodiment of the present invention said second outer layer will essentially consist of said thermoplastic polyurethane or blend of thermoplastic polyurethanes, optionally contianing up to 10%, preferably up to 7% and more preferably up to 5% of a masterbatch of the desired additives in a thermoplastic compatible resin, such as the same or another polyurethane resin or any other resin compatible therewith.

The overall thickness of th eprotective laminate according to the present invention is typcially comprised between about 25 and about 80 μm, preferably between about 30 and about 70 μm and even more particularly between about 35 and 60 μm.

The thickness of the first outer layer is generally at least 5 μm, preferably at least 7 μm and even more preferably at least 9 μm. As this polymer is the least expensive one, when the bulk of the laminate has to be increased that is the layer that is generally increased in thickness.

The second outer layer has a thickness that is generally comprised between about 5 and about 20 μm, preferably between about 7 and about 15 μm and even more preferably between about 8 and about 14 μm.

Thin polyamide core layers are generally sufficient to provide the laminate with the desired mechanical properties. Typical thicknesses are between about 5 μm and about 25 μm, preferably between about 10 and about 18 μm.

If present, the layers will have a thickness of few microns, e.g., from about 2 to about 10 μm, preferably from about 3 to about 8 μm and even more preferably from about 4 to about 6 μm.

The thermoplastic protective laminate according to the present invention is obtained to coextrusion. The film is not stretched or oriented, at least intentionally. A slight orientation, so-called accidental orientation, may be present depending on the production method employed.

A preferred method of manufacture thereof is the hot blown method.

Alternatively it is possible also to use the cast extrusion method, either through a round or preferably through a flat die.

The new protective laminate according to the present invention is then suitable employed in the manufacture of a molded carpet as known in the area.

Figure 2:
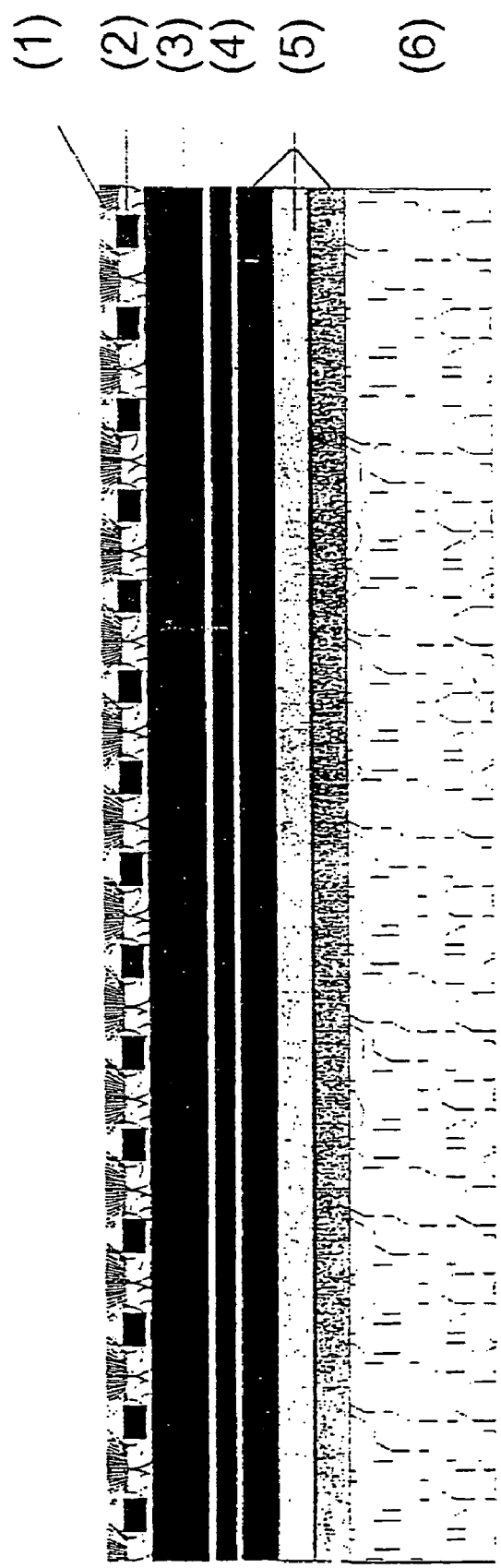
Figure 3:
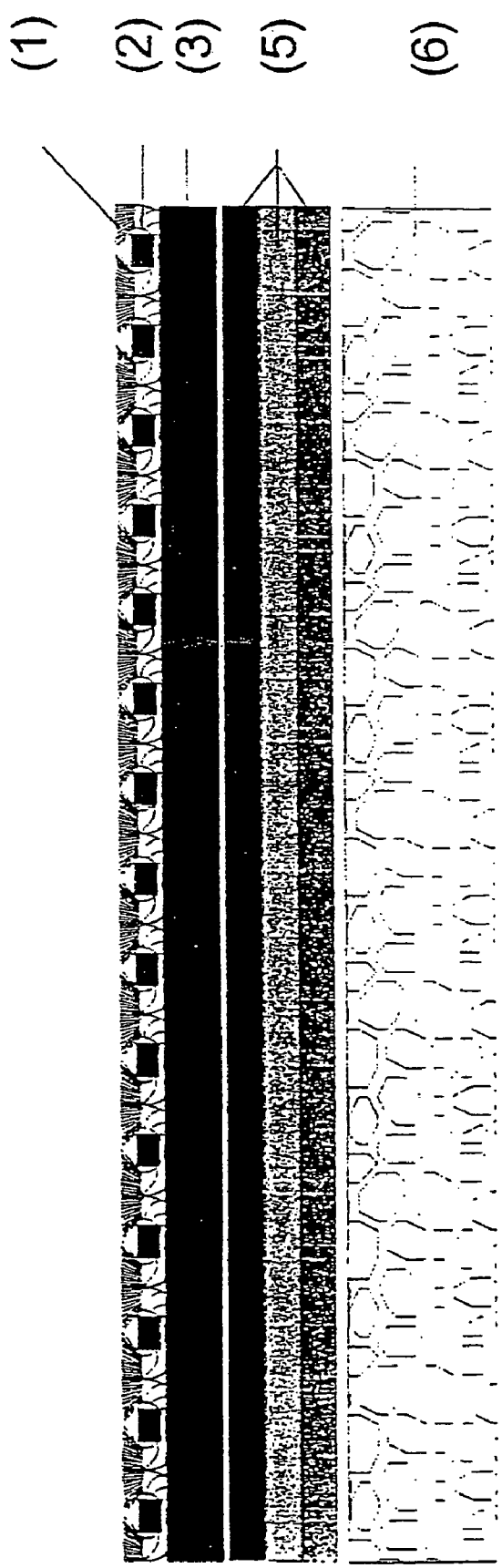

FIGS. 1, 2, and 3 represent a schematic cross-sectional view of alternative molded carpets that can be manufactured using the protective laminate according to the present invention.

In particular, with reference to FIG. 1, the unfused carpet, made up by the combination of (1), (2), and (3), wherein (1) represents a layer of carpet pile or of fleece, (2) is a layer of fleece of cotton weave, and (3) is a layer of latex or hot melt or polyethylene bond, is charged from the roll onto a feeder machine and sprinkled on the reverse side with polyethylene powder (200-400 g/m$^2$). The powder is melted into a film by a heat treatment forming layer (4) and a heavy layer (7) is laminated thereon. Then, the protective laminate of the invention is fixed with a polyethylene side to the heavy layer. After shaping in an extra operational step, polyurethane foam is applied under pressure to the free polyurethane side. Instead of a heavy layer, that is a non-woven material obtained from several resins, often recycle materials, fleece or a textile molding compound can be used as layer (7).

Alternatively, as illustrated in FIG. 2, the molded carpet does not contain a heavy layer (7) and the protective laiminate (5) is directly adhered with the polyethylene outer layer to the sintered polyethylene layer (4).

Still alternatively, as illustrated in FIG. 3, the protective laminate (5) of the present invention is directly adhered with the polyethylene outer layer to the latex or hot melt layer (3) without the intermediate sintered polyethylene layer (4).

The advantages of this overall method are many:
  the elasticity of the new thermoplastic laminate influenced by the polyurethane layer, improves puncture resistance and the molding capacity of the carpet structure;
  compared to the conventional polyethylene/polyamide laminates on the market, appreciable reductions in thickness are possible with the protective laminate of the invention;
  the use of the new laminate eliminates the problems caused by the curling of the polyethylene/polyamide conventional structures around the swell and the connecting part that does not lie flat Another object of the present invention is therefore a process for the preparation of a carpet comprising an upper fibrous layer, an intemediate thermoplastic protective laminate and a polyurethane foam layer wherein the polyurethane foam layer is formed on the surface of the protective laminate which is hot bonded to the upper fibrous layer characterized in the said protective laminate comprises a first outer layer which is facing the upper fibrous layer, comprising an ethylene homo- or copolymer, a core layer comprising a polyamide and a second outer layer comprising a thermoplastic polyurethane.

The invention is further illustrated by the following examples that are provided for the purpose of representation and are not to be construed as limiting the scope of the invention.

Unless indicated otherwise, all percentages are by weight.

EXAMPLES

Five layer films having the following general structure have been coextruded on a hot blown line:

LEPE/tie/PA/tie/TPU$_x$

General resin descriptions are shown in Table 1.

TABLE 1

| RESIN | TRADE NAME | SUPPLIER | DENSITY (g/cm$^1$) | Tm(° C.) | MFI (g/10 min) |
|---|---|---|---|---|---|
| LDPE | Quantum NA345-013 | Quantum Chem. | 0.922 | 125 | 3.2 |
| tie (anhydride grafted LLDPE) | Tymor 1203 | Norton Int. | 0.91 | 130 | 2.6 |
| PA Nylon 6/66 | Cniamid CF 815 | Caffaro | 1.12 | 195 | 3.5 |
| TPU$_1$ (ether type) | Elastollan 806-10 | BASF | 1.12 | 120 | 2.3 |
| TPU$_1$ (ester type) | Elastollan 883-50 | BASF | 1.19 | 120 | 3.0 |
| TPU$_1$ (ether type) | Elastollan 1154-D10 | BASF | 1.17 | 120 | 1.9 |
| TPU$_4$ | | | | | |
| TPU$_3$ plus 5% of antiblock Elastollan Konz. 978 concentrate by BASF | | | | | |
| TPU$_4$ | | | | | |
| TPU$_2$ plus 9% of antiblock Elastollan Konz. 978 (BASF). | | | | | |

The temperature profiles for the TPU were established so that to keep the polymer melt below the critical temperature of 230° C.

Both TPU and PA resins were pre-dried for at least 4 hours at 85-90° C. in a convection oven prior to extrusion. The coextrusion system was also equipped with an enclosed feeder and a dry/inert gas purge to prevent moisture absorption by the TPL from the atmosphere.

The film layers were added starting with LDPE at the bottom of the die and ending with the TPU, on the outside of the bubble at the top of the die.

Layer target thickness was 15 µm/5 µm/15 µm/5 µm/10 µm for the LDPE/tie/PA/tie/TPU layers respectively.

The obtained films were cooled with a saturated air ring, slit on both edges and separated to provide two single ply films that were wound with the TPU layer on the outside of the roll.

The invention claimed is:

1. A carpet comprising:
   an upper fibrous layer,
   an intermediate thermoplastic laminate in the form of a film comprising:
      a first outer layer facing the upper fibrous layer, the first outer layer comprising an ethylene homo- or co-polymer;
      a core layer comprising a polyamide; and
      a second outer layer comprising a thermoplastic polyurethane; and
   a polyurethane foam layer.

2. The carpet of claim 1 wherein the first outer layer comprises an ethylene copolymer.

3. The carpet of claim 1 wherein the first outer layer comprises an ethylene-α-olefin.

4. The carpet of claim 1 wherein the first outer layer comprises a medium density polyethylene.

5. The carpet of claim 1 wherein the first outer layer comprises a high density polyethylene.

6. The carpet of claim 1 wherein the first outer layer comprises a high density ethylene-α-olefin copolymer.

7. The carpet of claim 1 wherein the front outer layer comprises a medium density ethylene-α-olefin.

8. The carpet of claim 1 wherein the second outer layer comprises thermoplastic polyurethane of the ester types.

9. The carpet of claim 1 further comprising a tie layer bonding to the core layer to an outer layer selected from the first and second outer layers.

10. The carpet of claim 1 wherein the first outer layer comprises a polyethylene homopolymer.

11. The carpet of claim 1 wherein the first outer layer comprises a low density polyethylene.

12. The carpet of claim 1 wherein the core layer comprises a polyamide with a melting temperature below 220° C.

13. The carpet of claim 12 wherein the core layer comprises a polyamide with a melting temperature below 210° C.

14. The carpet of claim 1 wherein the second outer layer comprises thermoplastic polyurethane of the ether type.

15. A process for the preparation of the carpet of claim 1 comprising:
   forming the polyurethane foam layer on the surface of the second outer layer of the intermediate laminate.

16. The process of claim 15 wherein the intermediate laminate comprises a tie layer bonding the core layer to an outer layer selected from the first and second outer layers.

* * * * *